United States Patent [19]

Canela

[11] Patent Number: 5,497,695
[45] Date of Patent: Mar. 12, 1996

[54] FOOD STEAMER WITH AUTOMATIC TIMED STIRRING PADDLE

[76] Inventor: Heriberto Canela, 8027 W. 14 Ave., Hialeah, Fla. 33014

[21] Appl. No.: 366,196

[22] Filed: Dec. 30, 1994

[51] Int. Cl.⁶ ............................ A47J 27/00; A47J 36/32; B01F 7/16; B01F 7/20
[52] U.S. Cl. ............................ 99/335; 99/348; 366/130; 366/247; 366/249; 366/252; 366/279; 366/312
[58] Field of Search ............................ 99/335, 327, 332, 99/344, 348; 366/65, 98, 130, 142, 247–254, 285, 286, 331–333, 279, 289, 309, 312, 344

[56] References Cited

U.S. PATENT DOCUMENTS 5,201,263   4/1993   Teng ............................ 99/335

Primary Examiner—Timothy F. Simone
Attorney, Agent, or Firm—J. Sanchelima

[57] ABSTRACT

A food steamer with a stirring mechanism that can be set to start after a predetermined amount of time. A timer assembly and a gear assembly are mounted to the underside of the cover. The gear assembly includes a spring loaded gear that activates the gear assembly and causes the stirring assembly to rotate thereby avoiding over heating of portions of the foodstuff being cooked.

2 Claims, 2 Drawing Sheets

FOOD STEAMER WITH AUTOMATIC TIMED STIRRING PADDLE

BACKGROUND OF THE INVENTION

1. Field of the Invention

The present invention relates to a food steamer with a pre-programmed timed stirring paddle.

2. Description of the Related Art

Food steamers conventionally include a timer for cooking the food contained therein. However, none of them includes a mechanism for stirring the food while or after it has been cooked, which is necessary to prevent overheating of the foodstuff. This requires the constant attention of a user when the food is being cooked.

SUMMARY OF THE INVENTION

It is one of the main objects of the present invention to provide a device that automatically stirs the food while or after it is cooked, for a predetermined amount of time.

It is another object of this invention to provide a device that can be programmed to stir the food being cooked, after a given time, for a predetermined amount of time.

It is still another object of the present invention to provide a device that is self contained without requiring any electric power.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
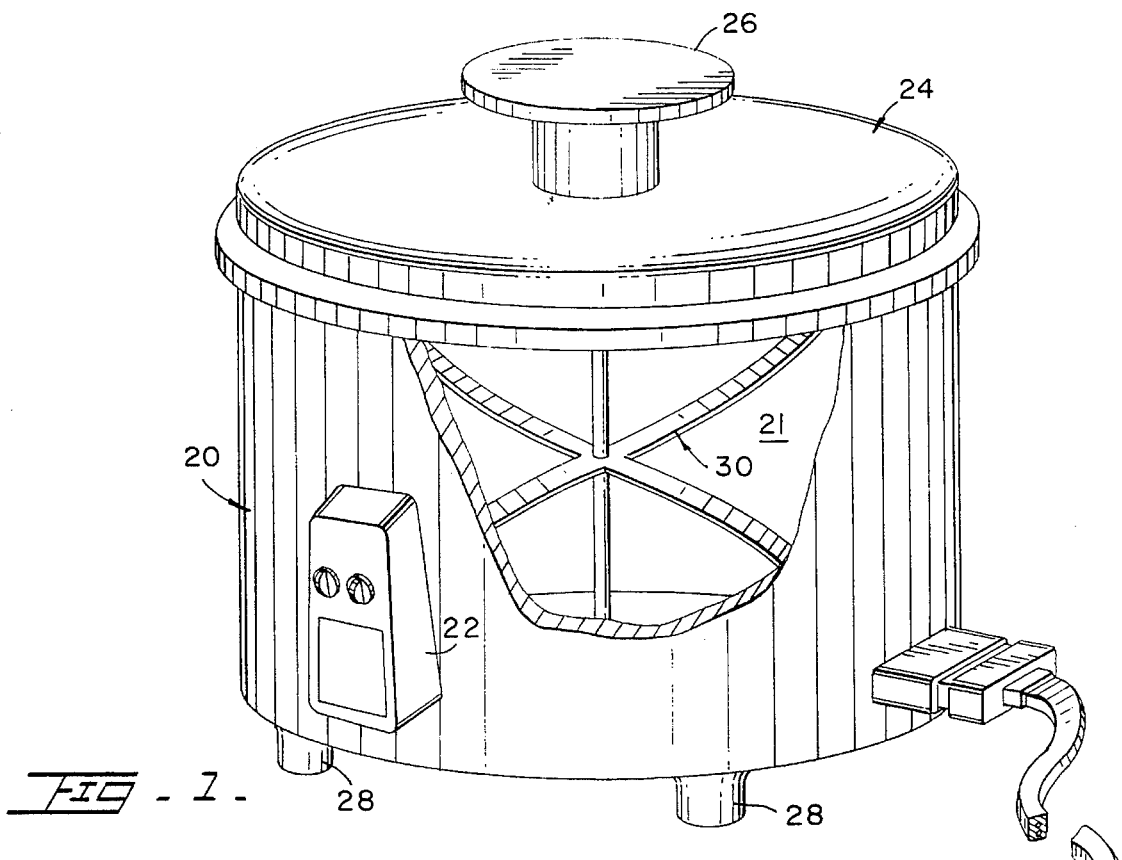
FIG. 1 is an illustration of a steamer with a partial cut out showing the stirring paddle inside the steamer.

Referring now to the drawings, where the present invention is generally referred to with numeral 10, it can be observed that it basically includes food steamer assembly 20, stirring assembly 30, gear assembly 40 and timer assembly 60.

Food steamer assembly 20 is a conventional rice steamer with wall 21, switch timer member 22, cover member 24, knob 26 and feet members 28, as it is shown in FIG. 1.

Figure 2:
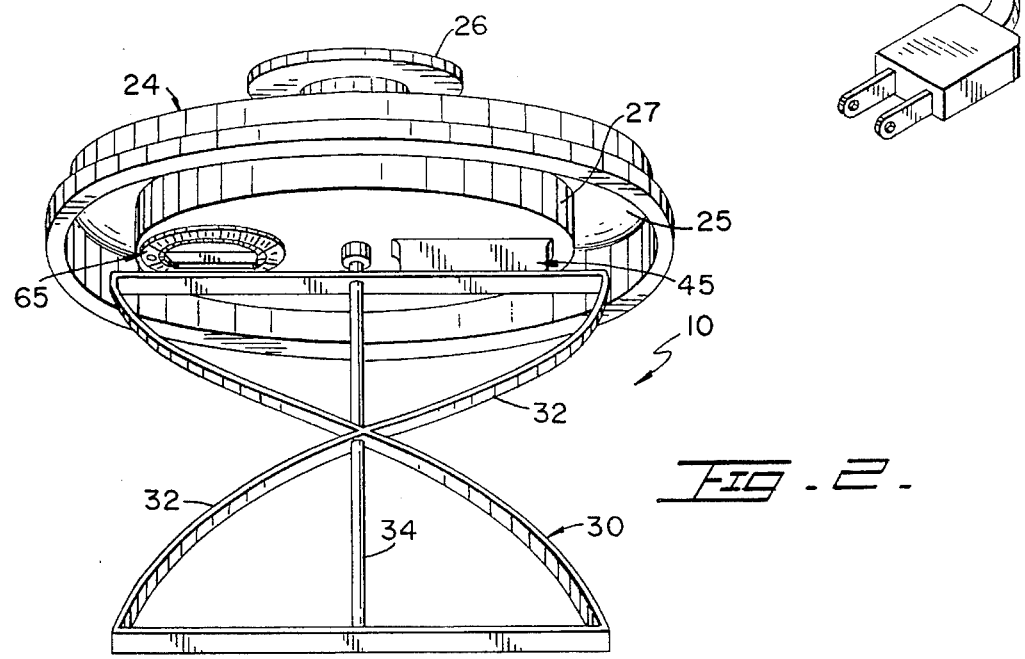
FIG. 2 is an inclined isometric view showing the underside of the cover for the steamer.

Stirring assembly 30, in the preferred embodiment, has shaft 34 and stirring paddle 32. Shaft 34 and stirring paddle 32 are rotably mounted to underside 25 of cover member 24, as is illustrated in FIG. 2.

Figure 3:
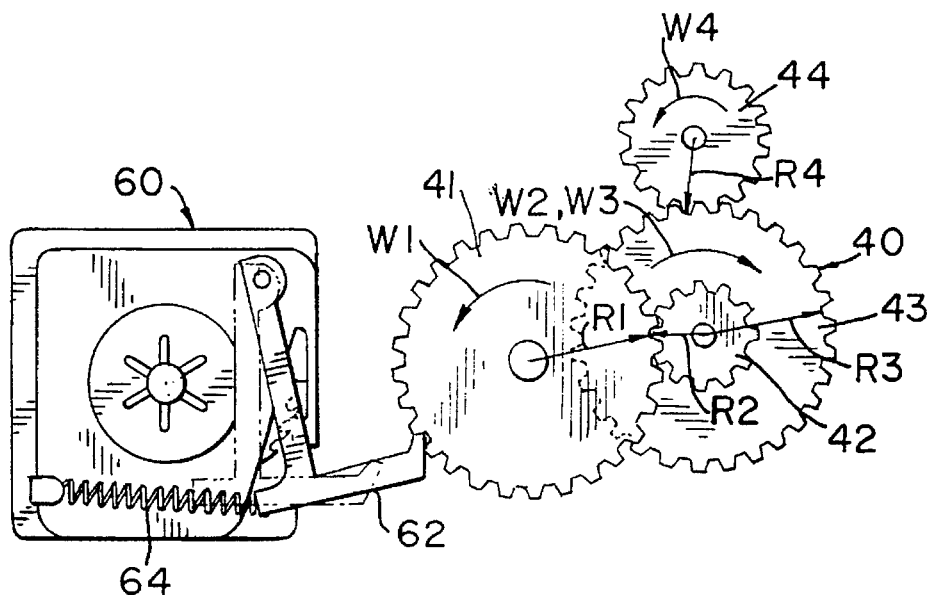
FIG. 3 is a schematic representation of the timer mechanism engaged to the gear assembly that moves the stirring paddle.
Figure 4:
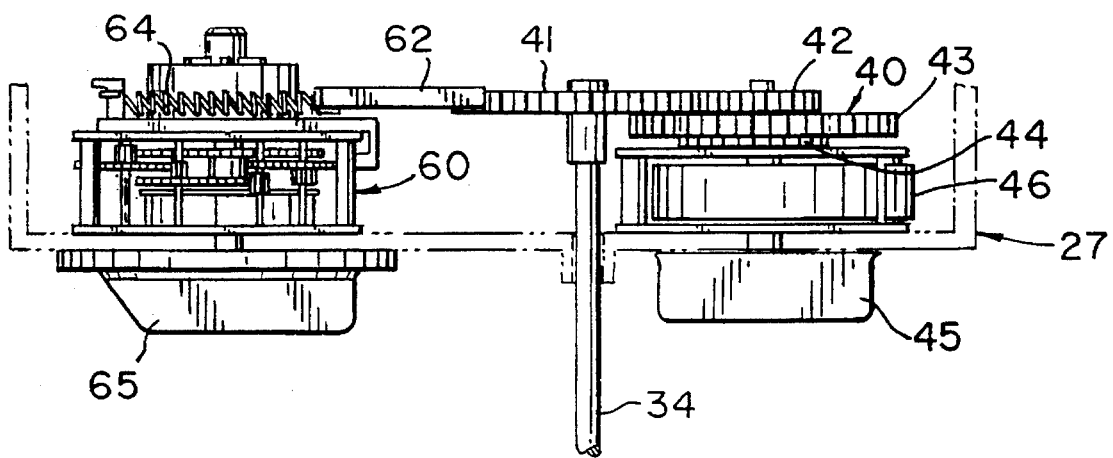
FIG. 4 represents an elevational side view of the gear assembly.

For a qualitative description of the operation of the present invention, FIG. 3 represents gear assembly 40 which comprises, in the preferred embodiment, stirring paddle gear 41 with radius R1 and rotational speed W1; pinion gear 42 with radius R2 and rotational speed W2; intermediate gear 43 with radius R3 and rotational speed W3; and driving gear 44 with radius R4 and rotational speed W4. Rotational speed W1 for stirring paddle gear 41 is, in the preferred embodiment, around ten revolutions per minute. This is adequate for stirring food being cooked in a steamer. Pinion gear 42 has speed W2 which is X times faster than W1 and, consequently, radius R2 is X times smaller than radius R1. Pinion gear 42 is rigidly mounted to intermediate gear 43, and consequently, its speed W3 is equal to W2. Radius R3, however, is Y times larger than radius R2. The force applied by pinion gear 42 to stirring paddle gear 41 is Y times greater than what was applied to gear 43 by driving gear 44. Driving gear 44 is spring loaded by bringing spring 46 to a forced position and the stored energy is released when brake element 62 of timer assembly 60 is released. A user actuates gear assembly 40 by turning winding knob 45. For instance, if cooking requires 10 minutes of heating before stirring is to begin, then timer assembly 60 can be set accordingly by turning winding knob 65. After 10 minutes, spring loaded brake element 62, helped by tension force from spring 64, releases stirring paddle gear 41, as is shown in FIGS. 3 and 4. Stirring paddle gear 41 starts rotating since it is driven by the energy stored by spring 46. Gear assembly 40 is preferably hermetically sealed to prevent it from being damaged by steam escaping from the food being cooked. The amount of stored energy can be varied by a user. This can be adjusted by the amount of compression applied to spring 46. Depending on the gears selected, the stirring action can be adjusted to vary their optional time.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A food steamer having a cover that includes an underside, comprising:
   A. stirring means rotatably mounted to the underside of said cover wherein said stirring means includes a shaft member and stirring paddle means mounted thereto;
   B. gear means mounted to the underside of said cover and said gear means further including spring means for storing mechanical energy so that said energy is releasable to drive said gear means and said gear means being adapted to cause said stirring means to rotate and wherein said gear means includes means for adjusting amount of time said gear means are activated; and
   C. timer means including brake means for selectively stopping said gear means over a predetermined amount of time prior to said gear means being activated.

2. The food steamer set forth in claim 1 wherein said gear and timer means are hermetically enclosed.

* * * * *